(12) United States Patent
Aoyama et al.

(10) Patent No.: US 6,380,127 B1
(45) Date of Patent: Apr. 30, 2002

(54) POROUS ORGANIC/METALLIC COMPOSITE

(75) Inventors: Yasuhiro Aoyama; Takehisa Dewa; Tomoya Sawaki, all of Fukuoka (JP)

(73) Assignee: Japan Science and Technology Corporation, Saitama (JP)

( * ) Notice: Subject to any disclaimer, the term of this patent is extended or adjusted under 35 U.S.C. 154(b) by 0 days.

(21) Appl. No.: 09/423,450

(22) PCT Filed: Mar. 8, 1999

(86) PCT No.: PCT/JP99/01112

§ 371 Date: Jan. 5, 2000

§ 102(e) Date: Jan. 5, 2000

(87) PCT Pub. No.: WO99/46269

PCT Pub. Date: Sep. 16, 1999

(30) Foreign Application Priority Data

Mar. 9, 1998 (JP) .............................. 10-056701
Mar. 9, 1998 (JP) .............................. 10-056702

(51) Int. Cl.$^7$ .............................. B01J 31/00; B01J 20/26
(52) U.S. Cl. .................. 502/159; 502/156; 502/167; 502/172; 502/402; 502/513; 502/527.24
(58) Field of Search ................. 502/156, 159, 502/402, 513, 523.24, 167, 172

(56) References Cited

U.S. PATENT DOCUMENTS

| | | | |
|---|---|---|---|
| 3,779,952 A | * 12/1973 | Leonard, Jr. ................ | 502/159 |
| 3,997,472 A | * 12/1976 | O'Driscoll et al. .......... | 502/159 |
| 4,797,380 A | * 1/1989 | Motoo et al. ................. | 502/159 |
| 5,112,787 A | * 5/1992 | Falke et al. .................. | 502/159 |
| 5,153,160 A | * 10/1992 | Saruyama et al. ........... | 502/159 |
| 5,759,942 A | * 6/1998 | Tan et al. ..................... | 502/159 |
| 5,985,785 A | * 11/1999 | Lane et al. ................... | 502/159 |

OTHER PUBLICATIONS

D.W. Robinson et al., J. Chem. Phys., vol. 90, No. 7, Apr. 1989, pp. 3427–3429.*

M. Kimura et al., J. Organometallic Chem., vol. 403, 1991, pp. 365–372, No Month.*

K. Endo et al., J. Am. Chem. Soc., vol. 119, pp. 4117–4122, 1997 No Month.*

T. Sawaki et al., Bull. Chem. Soc. Japan, vol. 70, pp. 3075–3079,1997 No Month.*

T. Ezuhara et al., New J. Chem., vol. 22, No. 2, pp. 183–188, 1998 No. Month.*

* cited by examiner

Primary Examiner—Mark L. Bell
Assistant Examiner—J. Pasterczyk
(74) Attorney, Agent, or Firm—Wenderoth, Lind & Ponack, L.L.P.

(57) ABSTRACT

A novel metal composite is provided which is useful as a catalyst or the like by the control of a structure of an apohost and the modification thereof and in which an organic apohost capable of forming a porous structure by a hydrogen bond is compounded with at least one type of transition metallic elements or compounds thereof.

16 Claims, 2 Drawing Sheets

POROUS ORGANIC/METALLIC COMPOSITE

This application is a 371 of PCT/JP99/01112 filed Mar. 8, 1999.

TECHNICAL FIELD

The invention of this application relates to a porous apohost composite. More specifically, the invention of this application relates to a novel organic apohost composite having a porous three-dimensional structure and useful as a functional material such as a catalyst, an optical response material, an organic electronic material or the like.

BACKGROUND OF THE INVENTION

Inorganic materials having pores, including zeolites, have been widely used so far as an adsorbent, a catalyst and the like for gas separation, exhaust gas treatment and further various organic synthesis reactions. With respect to organic materials, studies or development on porous materials having pores has also proceeded.

As organic materials having pores, foamed resins, resins obtained by using sol-gel transformation, resin films treated with plasma or electron beams and the like have been to date known. However, porous organic materials of which the pore size is controlled to a pore size of an atomic or molecular level and which can also be used as a catalyst of an organic synthesis reaction or the like have been almost unknown.

Under the circumstances, the inventors of this application have developed an organic apohost capable of forming a porous structure as a three-dimensional network by a hydrogen bond with respect to a novel porous organic product which has been completely unknown so far, and have specifically reported the structure, the characteristics and the availability of this product.

This organic apohost is formed with, for example, the following anthracene bisresorcin derivative (1) or monoresorcin derivative (2).

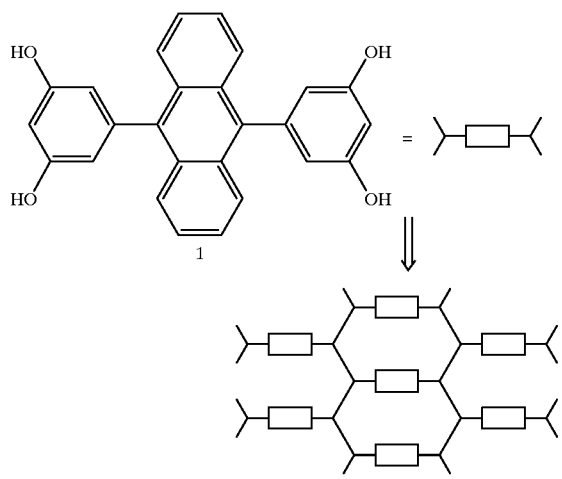

When the bisresorcin derivative (1) and the monoresorcin derivative (2) are crystallized from an appropriate solvent, a co-crystal containing a solvent molecule as a guest is obtained, and the structure forms a pseudo two-dimensional hydrogen bond network in which two-dimensional or one-dimensional chains are entangled with each other. And the guest molecule is incorporated quite selectively into the pore formed by this network structure. When the guest molecule is removed, a polycrystalline apohost is obtained.

This apohost incorporates the guest in the gaseous, liquid or solid state in the solid phase to restore a monocrystalline structure. The guest molecules are also easily exchanged.

For example, with respect to the above-mentioned organic apohost, the pore has the following characteristics.

<1> A hydrogen bond network is formed, but in the single state, a pore having a predetermined size is not present as such. Rather, a pore is present in a collapsed state.

<2> However, guest molecules in various states (gaseous, liquid, solid and the like) are incorporated into a pore to form a solid-phase complex. A monocrystalline structure is restored by the inclusion of the guest molecules. A cooperative structural change comes to occur by trapping the guest molecules.

It is also identified that the pore of the organic apohost formed with the above-mentioned anthracene-bisresorcin derivative (1) has the size of approximately 14×10×7 A and a catalytic activity of a stereoselective Diels-Alder reaction by simultaneous incorporation of acrolein and 1,3-cyclohexadiene into a pore is exhibited.

The above-mentioned organic apohost may also be called an "organic zeolite", and its technical development in future has attracted much interest.

Since the catalytic activity of the ordinary apohost is considered to be influenced by the incorporation into the pore and a hydrogen bond of a phenolic hydroxyl group that is not so strong inherently or an acid catalytic activity, to improve the catalytic activity and to enable the control and the modification of the porous structure or the hydrogen bond for further enlarging the functions have been important problems to the inventors of this application.

The invention of this application has been made in this background, and it aims to provide novel technical means for the enlargement of the functions of the organic apohost and the structural control and the modification to this end.

DISCLOSURE OF THE INVENTION

This application provides for solving the above-mentioned problems, a porous apohost composite characterized in that an organic apohost capable of forming a porous structure by a hydrogen bond is compounded with at least one type of transition metallic elements or compounds thereof, as a first invention.

Further, this application provides, in relation to the first invention, the composite wherein the organic apohost is compounded with at least one type of element of group 3 (formerly known as Group III) in the periodic table or compound thereof, as a second invention; the composite wherein the organic apohost is compounded with at least one type of element of group 4 (formerly known as Group IV) in the periodic table or compound thereof, as a third invention; the composite wherein the organic apohost has a three-dimensional extended structure by a hydrogen bond, as a fourth invention; and the composite wherein at least one type of metallic element or compound thereof is subjected to compounding by bonding between an oxygen or nitrogen atom of a functional group forming the hydrogen bond of the organic apohost and the metallic atom, as a fifth invention.

Further, this application also provides a catalyst for an organic synthesis reaction which is composed of the composite of any one of the first to fifth inventions, as a sixth invention.

BEST MODE FOR CARRYING OUT THE INVENTION

Figure 1:
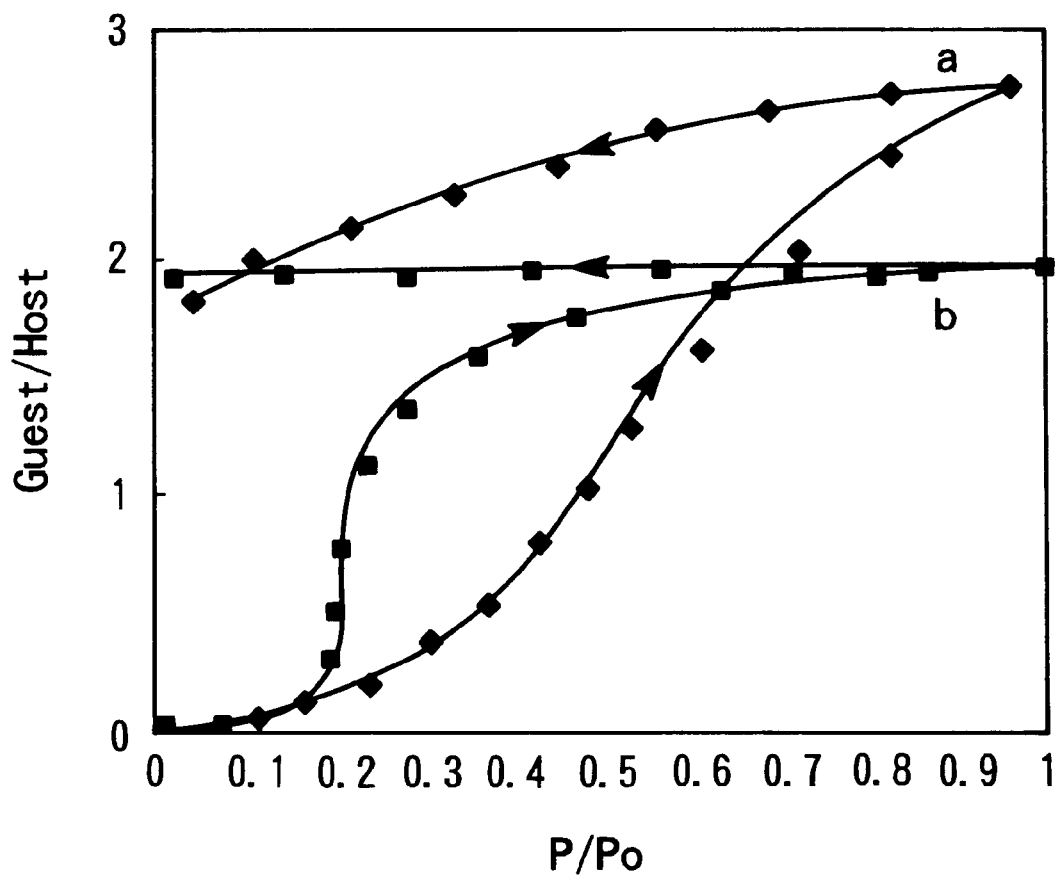
FIG. 1 is a view showing an adsorption isothermal curve of ethyl acetate by a vapor adsorption method.

The invention of this application has the above-mentioned characteristics. The mode for carrying out the same is described below.

The porous apohost composite of this invention is basically composed of

<1> an organic apohost capable of forming a pore by a hydrogen bond, and

<2> at least one type of transition metallic elements or compounds thereof.

The former apohost may be formed with various compounds including the above-mentioned anthracene bisresorcin derivative (1) or monoresorcin derivative (2). These unit compounds forming the apohost are considered to be any compounds that constitute the network by the hydrogen bond, the pore thereof having the above-mentioned characteristics.

Compounds having —OH (hydroxyl group), —NH$_2$ (amino group) or another nitrogen-containing group in view of the requirement of forming a hydrogen bond and represented by, for example, the general formula

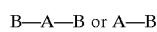

B—A—B or A—B (wherein A represents a polycyclic aromatic hydrocarbon group or heterocyclic group which may have a substituent, and B represents a monocyclic aromatic hydrocarbon group or heterocyclic group which has a hydroxyl group, an amino group or another nitrogen-containing group and may further have a substituent as required)

in view of the requirement of enabling the formation of a three-dimensional pore by the network of the bond are typically mentioned. For example, as the polycyclic aromatic hydrocarbon group of the above-mentioned A, a polycyclic aromatic hydrocarbon group that has an aromatic ring of anthracene, phenanthrene, pyrene or the like and has further an appropriate substituent is mentioned. Moreover, as the heterocyclic group, a polycyclic, heterocyclic group based on a pyridine ring, a diazine ring, a triazine ring, a pyrrolidine ring or the like is mentioned.

As the above-mentioned A, various groups are considered.

As the organic apohost, the following unit compounds (3), (4), (5), (6), (7), (8) and the like are considered.

3

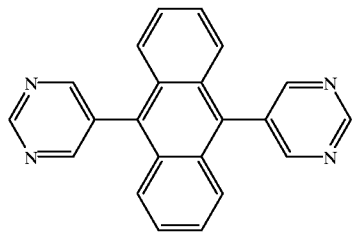

4

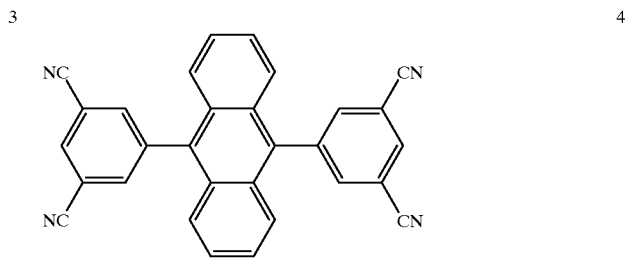

5

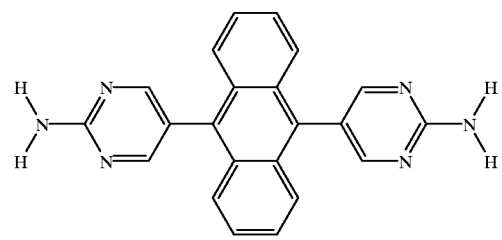

6

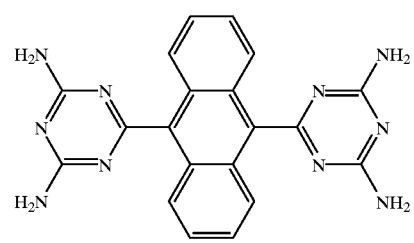

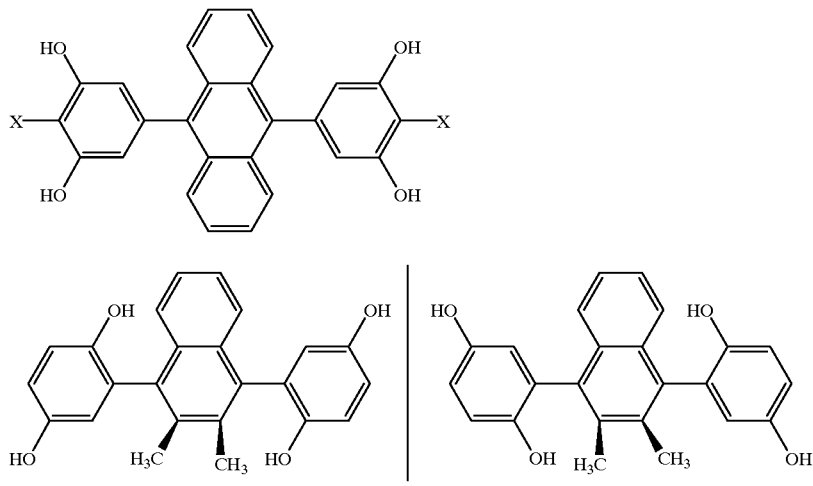

The symbol X in the compound (7) is, for example, a halogen atom, —SH, —NH$_2$, —CN, —CONH$_2$, —OCONH$_2$ or the like. In the compound (8) among these, an asymmetric structure is provided, and it is considered to be effectively used in an asymmetric catalytic reaction or the like.

For example, the transition metallic element in this invention which is compounded with the apohost may be various elements. Among others, the elements of groups 3, 13, 4 and 14 (formerly Groups III and IV) in the periodic table are mentioned as appropriate ones. The elements of groups 3 and 13 (formerly Group III) in the periodic table are aluminum (Al), boron (B), gallium (Ga) and indium (In) or scandium (Sc), yttrium (Y) and lanthanide as rare earth metals, and so forth. The compounding is achieved in these elements or the compounds thereof.

The metallic elements of groups 4 and 14 (formerly Group IV) in the periodic table are titanium (Ti), germanium (Ge), tin (Sn), lead (Pb), silicon (Si), zirconium (Zr), hafnium (Hf) and the like. The compounding is achieved in these metallic elements or the compounds thereof.

The structure by this compounding is considered to be by coordination of the above-mentioned element into the hydrogen bond of the apohost, for example, by formation of the coordination network of O—M$^{n+}$—O in the hydrogen bond O—H . . . O—H, by formation of the coordination network of N—M$^{n+}$—N in the hydrogen bond N—H . . . N—H, and further by incorporation into the apohost pore or the like as required.

The compounds may be various compounds, for example, inorganic compounds such as halides, mineral acid salts and the like, or organic compounds such as organic acid salts, alkoxides, amine salts, complex salts, organic complexes, organometallic compounds and the like.

In the porous apohost composite of this invention, the number of the unit compounds constituting the apohost and the size of the pore are controlled by the types of the unit compounds and the compounds of the elements, the proportions of the unit compounds and the elements or the compounds thereof used, the type of the solvent, the treatment temperature and the like. These are selected depending on the use purpose, for example, the purpose of using the same in a catalyst and the usage.

The composite of this invention can easily be produced by, for example, mixing the apohost with a solution or a dispersion of the metal or the compound thereof. The apohost present as a solid may be mixed, or the unit compound forming the apohost may be used.

And the porous apohost composite of this invention can be used as a catalyst, an optical response material, an electronic material or the like.

The Diels-Alder reaction or the like catalytically proceeds with the approaching effect of the reaction substrate by incorporation of the organic apohost into the pore and the Lewis acid catalytic effect accompanied by the coordination or the incorporation of the above-mentioned element or compound thereof.

Further, new optical materials and electronic materials can be developed by the interaction with the coordinating metal through the incorporation of the optical response material into the pore of the apohost.

This invention is illustrated more specifically by referring to the following Examples.

EXAMPLES

Example 1

Production of a Composite (1) The above-mentioned anthracene-bisresorcin derivative (1): C$_{26}$H$_{14}$(OH)$_4$ as the unit compound was crystallized from an ethyl acetate solvent to obtain a co-crystal containing two molecules of the ethyl acetate solvent as a guest. A polycrystalline apohost:1 free of this guest was obtained by thermally removing ethyl acetate as a volatile solvent.

This exhibited a high heat stability, and did not undergo melting or decomposition at 300° C. Nor was discoloration observed.

Further, when ethyl acetate was mixed as a liquid quest, the apohost:1 formed an adduct by including 2 molecules of ethyl acetate stoichiometrically (1:2.). The X-ray powder pattern of this adduct was the same as that of the monocrystalline sample obtained by recrystallization. It was identified that a local monocrystalline structure was restored by the inclusion of the guest.

Moreover, with respect to the apohost:1, the specific surface area was A=7 m$^2$/g as measured by a standard BET analysis of nitrogen adsorption at a liquid nitrogen temperature.

(2) A toluene solution of trimethylaluminum: Al(CH$_3$)$_3$ was added to a suspension of the above-mentioned apohost:1 in benzene or 1,3-cyclohexadiene, and this was stirred in a nitrogen atmosphere at room temperature for 24 hours. This solution was removed by centrifugation, and the resulting powder was dried in vacuo at 80° C. for from 1 to 2 days.

Further, the elemental analysis value of this powder was C, 70.63; H, 4.54; Al, 11.1 (according to elemental analysis through atomic absorption and/or X-ray fluorescence). This value agreed well with the calculated value, C, 70.89; H, 4.25; Al, 11.4 corresponding to $1^{4-} \cdot 2(\text{AlCH}_3)$, namely $C_{26}H_{14}(O^-)_4 \cdot 2$ (AlCH$_3$)

in the apohost:1=$C_{26}H_{14}(OH)_4$. Further, the presence of CH$_3$—Al could separately be identified by detecting generation of CPMAS ($\delta c=-9$ ppm) or methane.

(3) Besides, the BET specific surface area was evaluated as in the apohost:1, and it was identified to be A=240 m$^2$/g which was approximately more than 30 times that of the apohost:1.

The foregoing results reveal that in the porous apohost composite of this Example as an adduct, the pore occupies a higher proportion than in the apohost:1 (Example 2)

Production of a composite (1) The above-mentioned anthracene-bisresorcin derivative (1): $C_{26}H_{14}(OH)_4$ as the unit compound was crystallized from an ethyl acetate solvent to obtain a co-crystal containing two molecules of the ethyl acetate solvent as a guest. A polycrystalline apohost:1free of this guest was obtained by thermally removing ethyl acetate as a volatile solvent.

This exhibited a high heat stability, and did not undergo melting or decomposition at 300° C. Nor was discoloration observed.

Further, when ethyl acetate was mixed as a liquid quest, the apohost:1 formed an adduct by including 2 molecules of ethyl acetate stoichiometrically (1:2). The X-ray powder pattern of this adduct was the same as that of the monocrystalline sample obtained by recrystallization. It was identified that a local monocrystalline structure was restored by the inclusion of the guest.

Moreover, with respect to the apohost:1, the specific surface area was A=7 m$^2$/g as measured by a standard BET analysis of nitrogen adsorption at a liquid nitrogen temperature.

(2) The above-mentioned apohost:1 was mixed with a solution of di-isopropoxy-dichlorotitanium: ($^i$PrO)$_2$TiCl$_2$ in benzene or 1,3-cyclohexadiene, and the suspension was stirred in a nitrogen atmosphere at room temperature for 24 hours.

An orange powder was thereby obtained.

The apohost:1 was immediately dissolved in a polar organic solvent, DMSO$_2$-THF, but this orange powder was not dissolved therein.

The absence of an OH group was identified by lack of $\nu_{OH}$ in the IR spectrum.

When the powder was mixed with water, it turned yellow immediately, and it was identified that the apohost:1 was quantitatively regenerated.

In addition, the value of apohost:1/Ti=apohost:1/$^i$PrOH= 1/2 as a stoichiometric ratio was also identified by the $^1$H-NMR (on apohost:1 and $^i$PrOH) analysis of the powder after treatment with H$_2$O or 2NH$_2$SO$_4$ and the atomic absorption (on Ti) analysis.

In view of the foregoing, it was judged that the above-mentioned powder was an adduct represented by $1^{4-} \cdot 2[(^i\text{PrO})\text{TiCl}]$ and an adduct in which the OR group of the apohost:1 disappeared and [($^i$PrO)TiCl] was coordinated.

(3) With respect to the adduct powder, the incorporation of the guest molecule was evaluated. It was FIG. 1 that depicted an adsorption isothermal curve of ethyl acetate by a vapor adsorption method. The guest/host molar ratio is plotted against an ethyl acetate gas partial pressure (P) up to a saturated vapor pressure (P$_o$=92 torr) at 25° C.

The change when the gas partial pressure (P) is increased (→) from 0 torr and decreased (←) from a saturated state is shown in FIG. 1 with respect to <a> adduct
<b> apohost:1.

In case of the adduct <curve a>, the incorporation of the guest is more flexible and changeable than in case of the apohost:1 <curve b>.

Further, the BET specific surface area was evaluated in the same manner as in case of the apohost:1. Consequently, it was identified to be A=80 m$^2$/g which was approximately 10 times that of the apohost:1.

From the above-mentioned results, it becomes apparent that in the porous organic metal composite of this Example as the adduct, the pore occupies a higher proportion than in the apohost:1 and more flexible, changeable properties are provided.

Example 3

Catalytic Activity

The composite obtained in Example 1 was used as a catalyst in the Diels-Alder reaction of acrolein and 1,3-cyclohexadiene as schematically shown below.

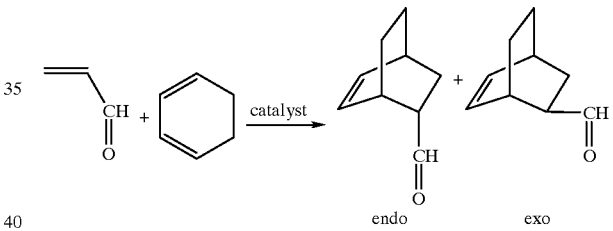

endo    exo

The porous apohost composite as the adduct is not dissolved at all in the system of acrolein and 1,3-cyclohexadiene, and is present in a solid state.

The reaction was conducted in a nitrogen atmosphere at 25° C. using 3 mol % of the composite. The ratio (molar ratio) of acrolein/1,3-cyclohexadiene used was 1/20. The half-life was evaluated by using a catalytic activity as timecourses. Further, the stereoselectivity of the ratio of endo/exo formed was also evaluated.

For comparison, the case where no catalyst was used at all and the case where the apohost:1 was used as a catalyst were also evaluated.

The results are shown in Table 1.

TABLE 1

| Catalyst | Half-life | endo/exo |
| --- | --- | --- |
| No | 500 h | 90/10 |
| apohost | 50 h | 95/5 |
| Al-apohost | <1 min | >99/1 |

From the results of Table 1, it becomes apparent that the catalytic activity of the composite in Example of this invention is quite high and further the stereoselectivity is also quite high.

Example 4

Catalytic Activity

Ethyl acrylate was used instead of acrolein in Example 3, and the composite of Example 1 was used as a catalyst in the Diels-Alder reaction of this ethyl acrylate and 1,3-cyclohexadiene.

The reaction was conducted at 60° C. It was identified that a catalytic activity of a half-life of 4.3 hours and quite a high stereoselectivity (endo/exo=100/0) were provided by the use of 3 mol % of the composite. Meanwhile, in case of the apohost:1, the catalytic reaction did not proceed at all.

Example 5

Catalytic Activity

The composite obtained in Example 1 was used as a catalyst in the Diels-Alder reaction of acrolein and 1,3-cyclohexadiene as schematically shown below.

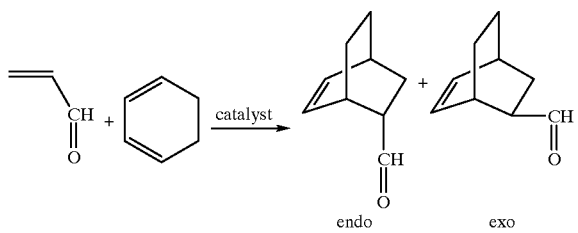

The porous organic metal composite as the adduct is not dissolved at all in the system of acrolein and 1,3-cyclohexadiene, and is present in a solid state.

Figure 2:
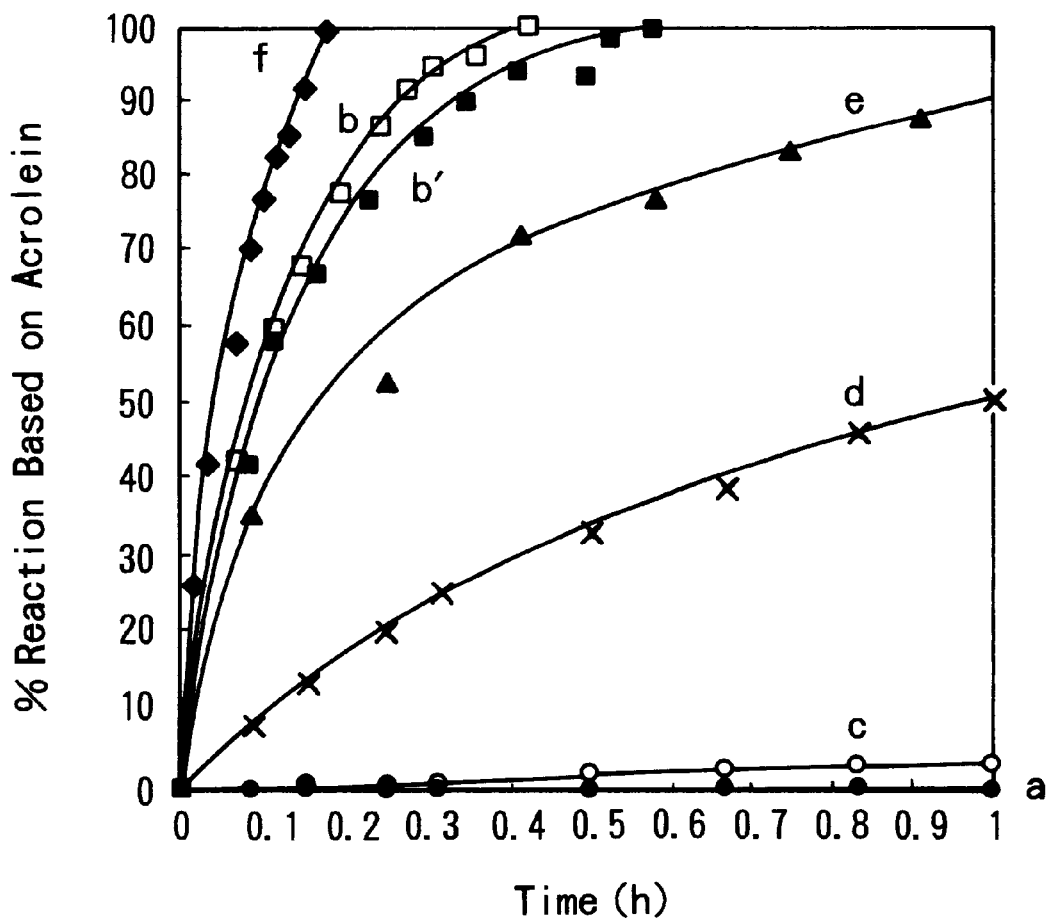
FIG. 2 is a view showing a catalytic activity as time-courses.

The reaction was conducted in a nitrogen atmosphere at 25° C. The ratio (molar ratio) of acrolein/1,3-cyclohexadiene used was 1/20. FIG. 2 shows the catalytic activity of the reaction as timecourses. The curves in FIG. 2 indicate the following.

<a> No catalyst is used.
<b> Use of 3 mol % of the composite catalyst.
<b'> Second use of 3 mol % of the composite catalyst as reuse.
<c> Use of the apohost:1 at a ratio of 3 mol %.
<d> Use of soluble ($^i$PrO)$_2$TiCl$_2$ at a ratio of 3 mol %.
<e> Use of 1 mol % of the composite catalyst.
<f> Use of 6 mol % of the composite catalyst.

Further, the following Table 2 shows the half-life and the ratio of endo/exo formed with respect to the above-mentioned <a>, <b>, <c>, and <d>.

TABLE 2

| Catalyst | Half-life | endo/exo |
|---|---|---|
| No | 500 h | 90/10 |
| apohost | 50 h | 95/5 |
| TiCl$_2$(OCH(CH$_3$)$_2$)$_2$ | 1 h | 98/2 |
| Ti-host | 4 min | >99/1 |

From the results of FIG. 2 and Table 2, it becomes apparent that the catalytic activity of the composite in Example of this invention is quite high and further the stereoselectivity is also quite high.

Further, from the results of <b> and <b'> in FIG. 2, it becomes apparent that almost no activity is lost even by the reuse after the recovery.

Example 6

Catalytic Activity

Ethyl acrylate was used instead of acrolein in Example 5, and the composite of Example 1 was used as a catalyst in the Diels-Alder reaction of this ethyl acrylate and 1,3-cyclohexadiene.

The reaction was conducted at 60° C. It was identified that a catalytic activity of the half-life of 5.3 hours and quite a high stereoselectivity (endo/exo=100/0) were provided by the use of 3 mol % of the composite. Meanwhile, in case of the apohost:1, the catalytic reaction did not proceed at all.

INDUSTRIAL APPLICABILITY

As having been described in detail above, the invention of this application provides, for example, a novel porous organic apohost composite having an excellent catalytic activity of a Lewis acid catalyst or the like and a high function.

With respect to the control of the structure of the apohost and the modification thereof the development of the new technology is accelerated.

What is claimed is:

1. A porous organic compound/metal composite comprising:
    an organic apohost; and
    at least one element selected from the group consisting of group 3 metals, rare earth metals of the lanthanide series, group 13 metals, and compounds thereof;
    wherein a porous structure is formed when said organic apohost is hydrogen bonded to said at least one element.

2. The composite of claim 1, wherein said organic apohost has a three-dimensionally extended structure having hydrogen bonding.

3. The composite of claim 1, wherein said at least one element forms a complex by bonding with an oxygen or nitrogen atom of a functional group of said organic apohost, which functional group forms the hydrogen bond in said organic apohost.

4. A catalyst for a Diels-Alder reaction, which comprises the composite of claim 1.

5. A catalyst for a Diels-Alder reaction, which comprises the composite of claim 2.

6. A catalyst for a Diels-Alder reaction, which comprises the composite of claim 3.

7. A process for forming the composite of claim 1, comprising mixing said apohost with a solution or a dispersion comprising said at least one element.

8. An optical response material comprising the composite of claim 1.

9. A porous organic compound/metal composite comprising:
    an organic apohost; and
    at least one element selected from the group consisting of group 4 metals, group 14 metals, and compounds thereof;
    wherein a porous structure is formed when said organic apohost is hydrogen bonded to said at least one element.

10. The composite of claim 9, wherein said organic apohost has a three-dimensionally extended structure having hydrogen bonding.

11. The composite of claim 9, wherein said at least one element forms a complex by bonding with an oxygen or nitrogen atom of a functional group of said organic apohost, which functional group forms the hydrogen bond in said organic apohost.

12. A catalyst for a Diels-Alder reaction, which comprises the composite of claim 9.

13. A catalyst for a Diels-Alder reaction, which comprises the composite of claim 10.

14. A catalyst for a Diels-Alder reaction, which comprises the composite of claim 11.

15. A process for forming the composite of claim 9, comprising mixing said apohost with a solution or a dispersion comprising said at least one element.

16. An optical response material comprising the composite of claim 9.

* * * * *